United States Patent [19]

Himsley

[11] 4,035,292
[45] July 12, 1977

[54] FLUID SOLID CONTACT PROCESS AND APPARATUS

[75] Inventor: Alexander Himsley, Toronto, Canada

[73] Assignee: Himsley Engineering Limited, Toronto, Canada

[21] Appl. No.: 576,872

[22] Filed: May 12, 1975

Related U.S. Application Data

[63] Continuation-in-part of Ser. No. 399,515, Sept. 21, 1973, abandoned.

[30] Foreign Application Priority Data

Nov. 16, 1972 Canada .............................. 156574

[51] Int. Cl.² ...................................... C01G 43/00
[52] U.S. Cl. ..................................... 210/33; 55/79; 55/390; 210/38 C; 210/189; 210/264; 423/6; 423/7

[58] Field of Search ...................... 55/79, 390, 446; 210/31, 33, 136, 264, 285, 286, 189, 38 C; 423/6, 7, 24

[56] References Cited

U.S. PATENT DOCUMENTS

| | | | |
|---|---|---|---|
| 2,719,206 | 9/1955 | Gilmore | 210/31 R |
| 3,192,126 | 6/1965 | Van Dyck Fear | 210/136 |
| 3,551,118 | 10/1967 | Cloete et al. | 210/33 |
| 3,674,685 | 7/1972 | Arden et al. | 210/33 |

Primary Examiner—Charles N. Hart
Assistant Examiner—Peter A. Hruskoci

[57] ABSTRACT

An improved process for continuous counter-current contact between a fluid to be treated and solid particles wherein the fluid flows through a column containing a plurality of contacting chambers each of which contains solid particles and in which intermittent transfer of the particles in a direction opposite to that of the fluid from each chamber to the chamber immediately adjacent is effected while maintaining a continuous flow of the fluid through the column.

16 Claims, 4 Drawing Figures

FLUID SOLID CONTACT PROCESS AND APPARATUS

This is a continuation-in-part of my application Ser. No. 399,515, filed Sept. 21, 1973 now abandoned.

BACKGROUND OF THE INVENTION

Processes are well known for continuously contacting fluids with solid particles to effect chemical separations by intimately contacting the fluid with solid particles, such as ion exchange resins, by causing the fluid to flow upward in a column counter-current to solid particles moving downward in the column. In such processes, where the solid particles are fluidized there is a tendency for the finer fraction of solid particles to be carried to the upper part of the column where they tend to be held permanently. These fine particles, being partially saturated with the components removed from the fluid stream, result in decreased efficiency in the operation of the process. Use of solid particles having a uniform particle size provides some improvement but due to attrition of the particles during the movements through the circuit there is eventually a build-up of small particles near the top of the column.

Other processes, employing packed beds of absorbent particles also have the disadvantage that, although they can be used with clarified fluids, they are not satisfactory for use with unclarified fluids or turbid liquids primarily because of a build-up of suspended matter on the particles. This results in excessive build-up of pressure in the column. Although this problem can be avoided by prior clarification of the fluid or liquid, it is often desirable to avoid such clarification because of expense involved.

In U.S. Pat. No. 3,207,577 a counter-current ion exchange is disclosed which is carried out in a vessel having a succession of horizontal levels with the resin being washed in a separate vessel and then proceeding to an elution vessel. In U.S. Pat. No. 3,235,488 a washing tank is disclosed which restores fouled anion exchange resins by violent agitation in a confined space with a limited breakdown of the resin particles. U.S. Pat. No. 3,152,072 relates to an ion exchange apparatus in which the resin particles are continuously transferred using liquid pressure with the resin being moved from the ion exchange column into a regenerator, then into a water washing vessel and back to the liquid passing column. A combination of ion exchange and flotation is disclosed in U.S. Pat. No. 3,240,556 with classification and clarification steps being eliminated in a resin-in-pulp process for treating uranium ores. In U.S. Pat. No. 3,551,118 solid-fluid contacting, e.g. ion exchange processes, is disclosed with conical plates disposed on above the other allowing passage of phases from one stage to the next.

None of the foregoing patents discloses the apparatus, and, in particular, the absorption column of the present invention which relates to an improved process and apparatus for continuous counter-current contact between a fluid to be treated and solid particles wherein the fluid flows through a column containing a plurality of contacting chambers each of which contains solid particles and in which intermittent transfer of the particles in a direction opposite to that of the fluid from each chamber to the chamber immediately adjoining is effected while maintaining a continuous flow of the fluid through the column.

SUMMARY

In the processes of the invention fluids are contacted and treated with solid particles with untreated fluid being continuously introduced into one end of a contacting column, the fluid being caused to flow through a plurality of contacting zones and being removed in treated form from the other end of the column. The solid particles are retained in the contacting zones by the flow of fluid and solid particles are periodically removed from the lowest or highest contacting zone as the case may be. Commencing with the next zone in the direction of flow of fluid, the solid particles are transferred progressively from each zone to the adjoining zone in the direction opposite to the flow of fluid, the transfer being effected while continuing the flow of untreated fluid into the column and of treated fluid out of the column. The column has positioned therein a plurality of vertically spaced baffles, the baffles and the wall of the column defining the contacting zones and each contacting zone having openings in the bottom and top thereof. Means acting in combination with the baffles prevent flow of solid particles through the openings upon cessation of fluid flow through the column.

It is an object of the present invention to provide an improved method and apparatus for fluid/solid counter-current contacting in a continuous process in a plurality of contacting zones contained in a column in which the solid particles are transferred intermittently in progression from each contacting zone to the next contacting zone in the direction opposite to the flow of fluid.

It is another object to provide an improved apparatus for the counter-current contacting of a fluid with solids when the density of the fluid is greater than the effective density of the solid particles or when the density of the fluid is less than the density of the solid particles.

It is a further object to provide an improved apparatus for the counter-current contacting in a continuous process of a turbid fluid with solid particles.

It is a still further object to provide an improved apparatus for continuously contacting a fluid with solid particles in a plurality of zones which may be shut down at any time while simultaneously preventing mixing of particles of one zone with those from another.

The objects, advantages and characterising features of the invention will become more apparent upon consideration of the following detailed description thereof when considered in conjunction with the accompanying drawings.

DESCRIPTION OF THE PREFERRED EMBODIMENTS

Figure 1:
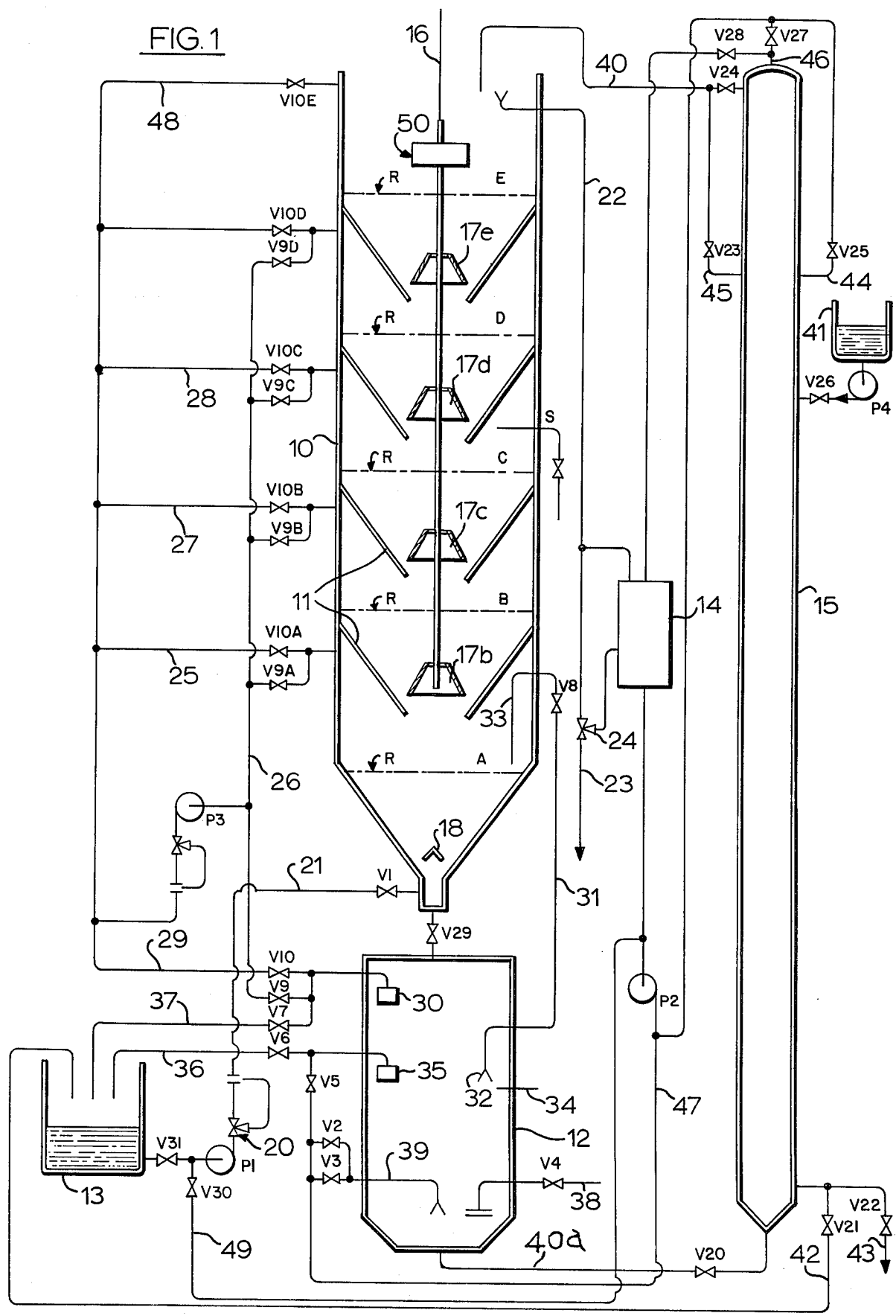
FIG. 1 shows a schematic view of an embodiment of the contacting column of the invention together with associated equipment.
Figure 2:
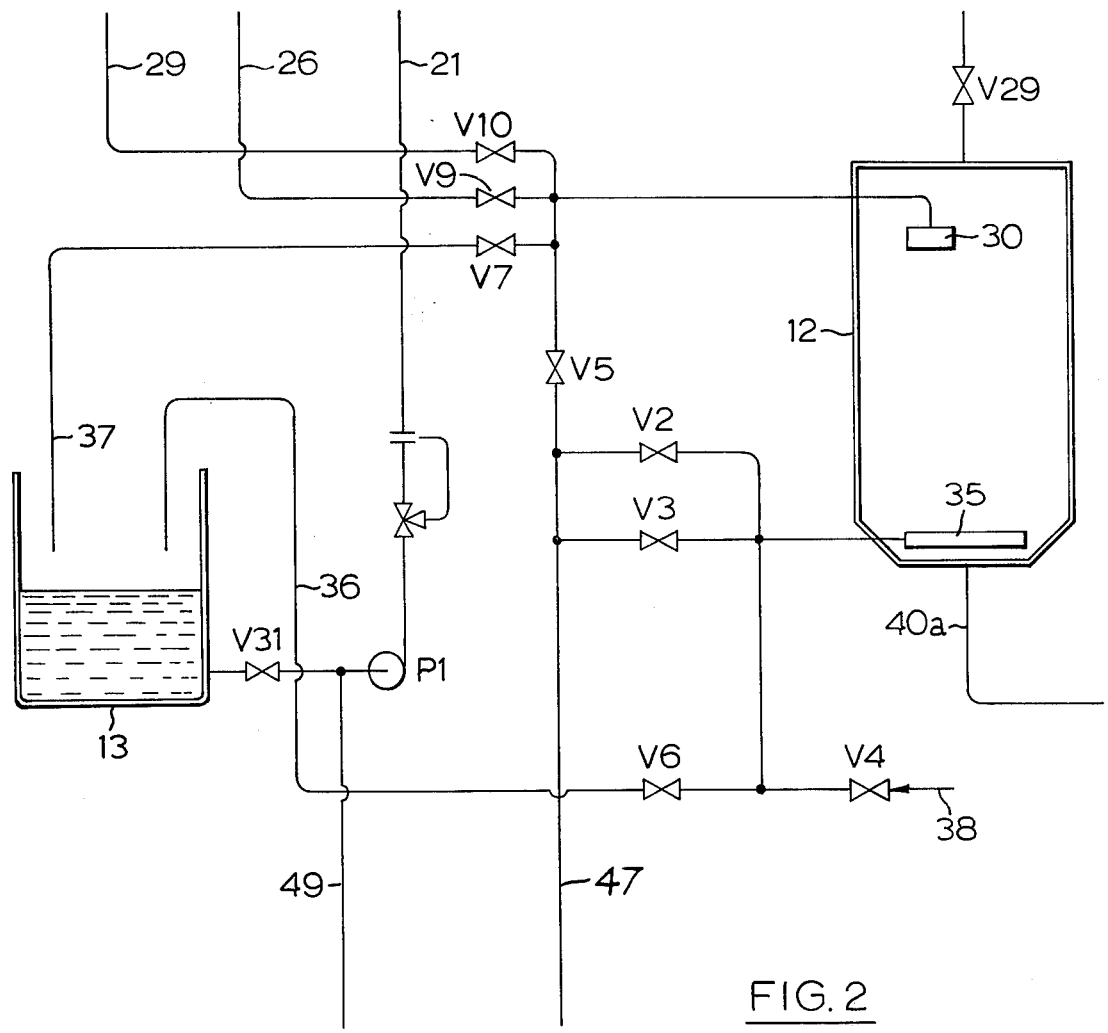
FIG. 2 illustrates a variation of the wash system which may be used.

Referring to the drawing, FIG. 1 shows an absorption column 10, the bottom of which is in the shape of an inverted cone, containing a number of chambers A to E separated from each other by baffles 11, in the shape of an inverted frustum of a hollow cone, a backwash chamber 12, located below the absorption column, a feed tank 13, a clarified barren liquid tank 14, an elution column 15, and associated pumps, piping and valves.

Mounted centrally in the column 10, by means not shown, is a valve rod 16 carrying hollow cones 17b to 17e in the chambers B to E, respectively, having a base member with a diameter slightly greater than the diameter of the opening in the baffles and adapted to close the openings. A hollow drum 50 is attached to the rod 16 when necessary to provide buoyancy to reduce the dead weight of the rod. A cone 18 is mounted in the bottom of the chamber A by means not shown and is spaced from the walls of the column to permit flow around its base. In the static position the valve rod 16 rests down as far as it will go with the cones 17b to 17e closing off the bottoms of their respective chambers.

While the apparatus can be used in the treatment of a variety of fluids with a variety of solids, the invention will be described for purposes of illustration as if the fluid is water and the solid is an ion exchange resin.

Under normal operating conditions the chambers A to E each contain a definite quantity of ion exchange resin or other sorbant. The quantity may be calculated in accordance with the various factors affecting the absorption process such as flow rate, particle size, concentration of ions in the feed, the type of resin being used, diffusion coefficients, etc. Prior to start-up all the resin resides in the bottom of the chambers being prevented from dropping by the cones 17b to 17e which rest on the baffles 11. Liquid containing the desirable components to be recovered and commonly referred to in hydrometallurgical applications as pregnant liquor is pumped from the feed tank 13 by pump P1 at a rate Q controlled by flow control valve 20 through line 21 and valve VI into the bottom of the chamber A. The liquid flows around the cone 18 in the chamber A and on up the column and overflows from the chamber E through line 22.

When the flow of liquid is started the valve rod 16 is forced upward by the upward flowing liquid, allowing liquid to pass around the cones 17b to 17e. The valve rod 16 is provided with a stop, not shown, to limit its upward movement in order to maintain a flow rate around the cones sufficient to prevent the descent of resin. The necessary flow rate for particular operating conditions can be readily determined by those skilled in the art. The resin in each chamber is expanded somewhat, i.e. fluidized by the upward fluid flow but under proper flow condition generally remains below a line represented by broken line R. For example, the feed leaving the chamber A and entering the chamber B exerts a pressure on the cone 17b and flows around it into the bottom of the chamber B. Similarly liquid flowing around the cone 17c enters the chamber C without carrying with it resin from the chamber B, and so on throughout the height of the column. Treated liquid from the chamber E overflows through the line 22 and a portion is clarified and stored in the tank 14 with the remainder flowing to tailings through line 23 under the control of level controller 24.

Periodically a sample of liquid is withdrawn for testing from the chamber C, through sample line S. When the sample shows that there has been a breakthrough of the material being recovered from the liquid, indicating saturation of the resin in the lower chamber, the resin in the chamber A is drawn off for regeneration. Meanwhile, the breakthrough of the material being recovered at the top of the chamber C would be captured by the resin in the chamber D. The resin from each chamber is substantially completely transferred to the chamber immediately below and fresh resin added to the chamber E. These transfers are carried out in sequence up the column without interrupting the flow of pregnant liquor into the bottom chamber of the column or the flow of barren liquid from the chamber E through the line 22 and the baffles 11 are so arranged, e.g. in the shape of inverted frustums of hollow cones, as shown, to allow the substantially complete transfer of solid particles from one chamber to another and to prevent solids from accumulating in any chamber.

In the preferred method of transferring the resin, pump P3 which has a capacity in excess of that of the pump P1, for example 2Q, is started and valves V29, V9 and V10A are opened. This causes a flow of 2Q from chamber 12 through strainer 30 and valve V9 to the suction of pump P3 via line 26. The pump P3 delivers this quantity (2Q) to the chamber A through the valve V10A via line 25. To satisfy the demand of 2Q by pump P3 a flow of 2Q must pass from chamber A to chamber 12 via valve V29.

The total flow into chamber A is 3Q made up of 2Q through valve V10A and Q through valve V1. The flow out of chamber A is 2Q via valve V29 and therefore an amount equivalent to Q continues to pass upward from the chamber A into the chamber B around the cone 17b and so on to the top of the column. The flow from the chamber A to the backwash chamber 12 carries with it the resin from the chamber A. The time required for this transfer is dependent upon the flow induced by the pump P3 and the volume and specific weight of resin. The duration may be controlled by a timer or a suitable sensing device. At the end of this first stage of resin transfer, valves V9A V10B are opened and the valves V29, V9, V10A closed.

Resin is then transferred from the chamber B to the chamber A by the pump P3 drawing a flow, for example 2Q, from the chamber A through the valve V9A and line 26 and delivering it into the chamber B through the valve V10B via line 27. Since there is a continuing flow, Q, through the valve VI into the chamber A, in order to satisfy the pump P3, a volume of liquid equal to Q flows downward around the cone 17b from the chamber B into the chamber A, carrying with it the resin from the chamber B, while a flow equal to Q continues to flow from the chamber B around the cone 17c into the chamber C and on up the column.

When the chamber B is empty of resin the valves V9A and V10B are closed and valves V9B and V10C are opened. This allows the pump P3 to draw a flow of 2Q from the chamber B through the valve V9B and the line 26 and deliver it to the chamber C through the valve V10C via line 28. Since there is a flow equal to Q passing up the column form the chamber A to the chamber B, to satisfy the pump P3 a flow equal to Q must pass down from the chamber C to the chamber B thereby transferring the resin contained in the chamber C into the chamber B. The process of resin transfer is continued until the resin from each chamber has been transferred to the chamber below by manipulating appropriate valves V9C, V10D and V9D and V10E in the appropriate sequence similar to that described with reference to the lower chambers. When the resin from the chamber E has been transferred to the chamber D the valves V9D and V10E are closed. Freshly regenerated resin is then added to the chamber E. This completes the transfer of resin until a sample withdrawn through the line S again indicates a breakthrough at which time the procedure for transferring resin is repeated.

It will be noted that, during the whole of this transfer process, pregnant liquor is continuously fed by the pump P1 through the valve V1 into the bottom of the column 10, and liquid flows continuously up the column and barren liquid is removed through the line 22. The column may of course contain a greater or smaller number of contacting chambers as desired for satisfactory operation.

Although reference has been made to the capacity of the pump P3 as being 2Q or twice that of the pump P1 this is not a critical requirement. It could be, for example, three or four times the capacity of the pump P1, the actual relationship being chosen on the basis of the time in which it is desired to transfer the resin. The greater the capacity of the pump P3 compared to that of the pump P1, the shorter will be the transfer time. Actually, the pump P3 is not essential for the practice of the invention although without it a long time would be required for resin transfer. Transfer without the pump P3 can be achieved by opening the valves V9A and V9B allowing the flow Q to flow from the chamber A to the chamber B partially through the valves V9A and V9B and partially around the cone 17b. The resultant lower flow around the cone 17b will be insufficient to prevent the resin from falling into the chamber A while the resin in the chamber C and the higher chambers will be kept in position by the flow, Q, passing around the appropriate cone. Thus, it is only necessary to reduce the rate of flow between chambers to the points where resin falls into the adjoining chamber, and reference herein, and in the appended claims, to reducing rate of flow between chambers is taken to include the actual reversing of flow between chambers.

When the transfer of resin has been completed the volume of resin in the backwash chamber 12 is adjusted by opening valve V8, the valve V9A and valve V10 which results in a flow 2Q from the chamber A through the valve V9A, the line 26 and line 29 and the valve V10 and into the chamber 12 through strainer 30. A similar flow passes upward through line 31, having entered at inlet 32, through valve V8 into the chamber A through line 33. Resin in the chamber 12 above the inlet 32 is carried into the chamber A leaving a definite quantity of resin in the chamber 12. A probe 34 in the chamber 12 adjacent the inlet 32 can be used to serve as a check that the backwash chamber has received the proper volume of resin and provide a warning in the event that the level falls below this point.

When the level of resin in the chamber 12 has been adjusted the valves V8, V9A and V10 are closed and valves V6 and V7 opened. This causes the liquid in the upper part of the chamber 12 to flow out by gravity through strainer 35, the valve V6 and line 36 into the tank 13 leaving a space at the top of the tank filled with air entering through line 37, the valve V7 and the strainer 30. The level should be lowered to approximately 6 to 12 inches above the resin level and this can be determined by a level probe mounted in the sidewall of the tank or, from experience, a timer can be set to allow the tank to partially drain by gravity. The valve V6 is then closed and valve V4 is opened allowing air under pressure, from a source not shown, to enter the chamber 12 through line 38 and pass upwards through the bed of resin scouring it to release any slimes or particulate matter that may be adhering to the surface. The air leaves the chamber 12 through the strainer 30, the valve V7 and the line 37. The duration of the scouring period will depend on the amount, concentration and nature of the contaminants and of course this scouring operation can be omitted if operation conditions permit.

At the end of the air scour period, valve V3 is opened and clean water or clarified barren liquid from the tank 14 is pumped by pump P2 through line 47 into the bottom of the chamber 12. Thus a mixture of air and clarified barren liquid flows up through the resin and out through the strainer 30, the valve V7 and the line 37 to the feed tank 13. The valve V4 is then closed and barren liquid alone backwashes the resin until it is clean. The duration of this step may be determined by light transmission measurements through the backwash water leaving the backwash chamber 12 although once experience has been gained a definite time can be used. Once the contaminants have been removed the resin is ready for transfer to the elution column 15 for recovery of the desirable components. This transfer is achieved by closing the valves V3 and V7 and opening valves V2, V5, V20 and V28. Clarified barren liquor from the tank 14 is pumped by the pump P2 entering the chamber 12 partially through line 39 and partially through the strainer 35 respectively. The liquid entering through the line 39 fluidizes the resin at the bottom of the chamber and it flows out as a slurry through line 40a into the bottom of the elution column 15, by the flow of liquid induced by the pump P2 which enters the chamber 12 through the strainer 35. The relative flows through the valves V2 and V5 govern the rate at which the resin is transferred. In the preferred operation the flow through the valve V5 is at least 1.5 times the flow through the valve V2. The termination of this transfer operation may be controlled either on the basis of light transmission on a clear section of line 40a or a device actuated by the level of resin in the column 15. On completion of the transfer, the valves V2, V5, V20 and V28 are closed and the pump P2 is stopped.

Although FIG. 1 shows a separate backwash chamber it can form an integral part of the contacting column with the upper part of the chamber surrounding the bottom of the column.

The resin transferred from the chamber 12 will be in the lower section of the column 15. To recover the desirable components from it the clarified barren liquid used for transporting the resin is first displaced from the interstices of the resin by opening valves V21, and V27 and pumping clarified barren liquid from the storage tank 14 by the pump P2 through the valve V27 downward through the column 15, the valve V21 and line 42 to the feed tank 13 at a controlled rate just sufficient (approx. 0.6 volumes of liquid per volume of resin), to displace the barren liquid. The barren liquid entering through the valve V27 rinses the freshly regenerated resin in the top of the column 15. All valves associated with the column are then closed and the pump P2 stopped for a short period of time for ion exchange to take place or in other words to allow the elutant to achieve equilibrium with the resin. The duration of the period will depend on the overall transport rates of the absorption cycle as well as other conditions of operation and can be readily determined by those skilled in the art. At the end of the period a predetermined volume of the eluate containing the desired components is then removed from the column through line 43 by starting the pump P2 and pump P4 and opening valves V22 and V26 and the valve V27.

The barren liquid entering through the valve V27 further rinses the freshly regenerated resin in the top of the column 15 and dilutes the regenerant from tank 41 to the required strength. After the predetermined volume of regenerant has entered the column 15, the valves V22, V26 and V27 are closed and the pumps P2 and P4 are stopped and the resin in the column 15 remains in contact with the regenerant.

The column 15 holds several batches of resin, for example three or four, depending upon the operating transfer rates. Each resin batch gradually moves up the column 15, being pushed up by a batch of freshly washed resin from the backwash chamber 12 entering at the bottom. Each resin is transferred from the top of the column 15 to the chamber E of the contacting column 10 by starting the pump P2 and opening valves V23 and V25 and the valve V27. Lines 44 and 45 join the column 15 at approximately the same level. The valves V25 and V27 are used to control the relative flows entering the column through the line 44 and line 46 with a minor proportion entering through the line 44 and a major proportion through the line 46. The flow entering through the line 44 produces a slurry of the resin in the column adjacent to the point at which the line 45 joins the column and the major portion (at least 60 percent entering through the line 46 forces the slurried resin from the column through the line 45 and the line 40 into the chamber E of the column 10.

In the case where there is too much resin in the column 15 and there is insufficient space for resin from the backwash tank to enter the top portion of the column 15, then the excess resin can be removed through valve V24.

It may be found desirable to lower the liquid level in the column 15 after transferring resin to the column 10 to a point just above the remaining resin level. This is done by opening either the valve V21 or the valve V22 or it could be carried out by a separate outlet valve (not shown) taken off the lower end of the line 44. This serves to lower the pressure required to introduce resin into the bottom of column 15. It is to be noted that the elution column 15 has smooth internal surfaces with no protruding pipes or fittings within to interfere with resin movement.

The entire operation may be shut down by closing all valves and stopping the pumps. The resultant stopping of upward flow of liquid in the column 10 allows the valve rod 16 to drop causing the cones 17b to 17e to seal off the bottom of their respective contacting chambers thus retaining the resin in each chamber.

In some absorption processes the absorbent may change its density appreciably in which case the diameter of the chamber may be varied to obtain the same degree of fluidization in each column. For example, in the case of uranium absorption on an ion exchange resin the density of the resin will increase as it takes up uranium. Therefore to obtain the same approximate voidage or bed expansion the diameter of the lowest contacting chamber may be lss than the diameter of the uppermost contacting chamber.

When the plant is initially commissioned a definite quantity of resin may be charged through suitable access ports in the wall of the column 10, the valve rod 16 being in its lowest position. Alternatively, the desired volume of resin for the chamber A can be placed in the chamber E and transferred downwards through the upper chambers to the chamber A. To do this the column 10 is filled with liquid, the pump P1 is started, valve V30 is opened and valve V31 is closed. Barren liquid pumped from the tank 14 flows through lines 49 and 21 and valve V1 into the bottom of the chamber A at rate Q. The valve V9A and V10E are opened and the pump P3 used to induce a flow from the chamber A through line 26 and to the chamber E through the valve V10E via line 48. During this operation the valve rod 16 should be held up mechanically to facilitate more rapid downward movement of the resin. When the resin has moved down into the chamber A, the valve V9A is closed and the valve V9B opened. The resin for the chamber B is then placed in the chamber E and moves down into the chamber B and so on for the higher chambers. The resin is prevented from going into the chamber below the desired one because of the flow Q of liquid around the cone in the chamber to which the resin is being charged.

Figure 3:
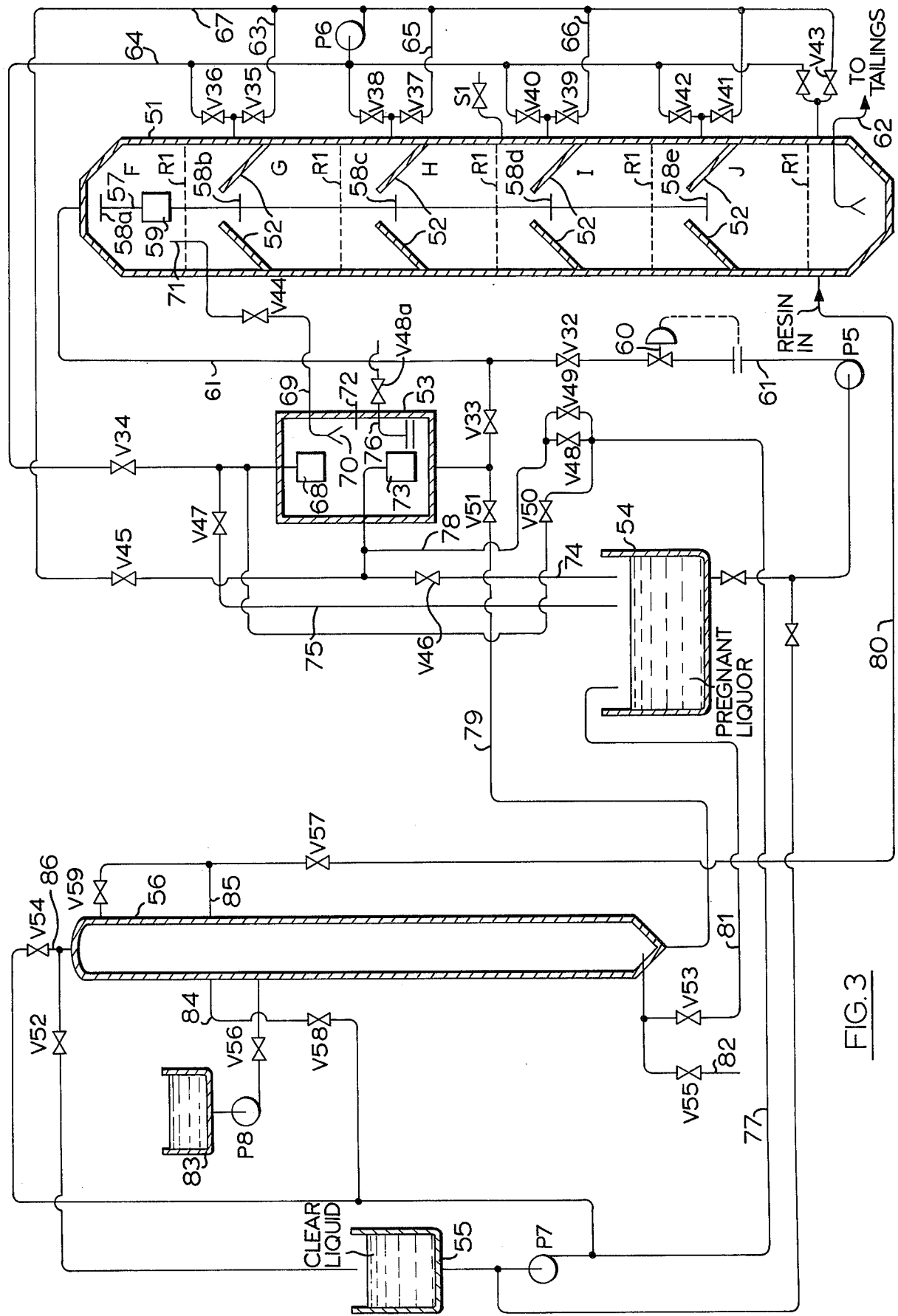
FIG. 3 is a schematic representation of a system embodying the invention and using fluid down flow in the contacting column.

As aforementioned, the invention is useful in the counter-current contacting of liquid with solids when the density of the liquid is greater than the effective density of the solid particles and FIG. 3 illustrates schematically an embodiment of the invention used in such a situation. Referring to FIG. 3, an absorption column 51 is shown which contains a number of chambers F to J separated from each other by baffles 52, in the shape of a frustum of a hollow cone, a backwash chamber 53, a feed tank 54, a clear liquid tank 55, an elution column 56, and associated pumps, piping and valves.

Mounted centrally in the column 51, by means not shown, is a valve rod 57 carrying circular members 58a to 58e in the chambers G to J, respectively, with a diameter slightly greater than the diameter of the opening in the baffles 52 and adapted to close the openings. A hollow drum 59 is attached to the rod 57 to provide buoyancy to overcome the dead weight of the rod. In the static position the valve rod 57 rests with the members 58a to 58e closing off the tops of their respective chambers.

As aforementioned, the apparatus can be used in the treatment of a variety of liquids with a variety of solids, but the operation of the embodiment of FIG. 3 will be described for purposes of illustration as if the liquid is water and the solid is an ion exchange resin.

As with the embodiment shown in FIG. 1 under normal conditions the chambers F to J each contain a definite quantity of ion exchange resin or other sorbant. The quantity may be calculated as set forth hereinbefore. Prior to start-up all the resin resides in the top of the chambers being prevented from rising by the members 58a to 58e which rest against the baffles 52. Pregnant liquor is pumped from the feed tank 54 by pump P5 at a rate Q' controlled by flow control valve 60 through line 61 and valve V32 into the top of the chamber F. The liquid flows around the member 58a in the chamber F and on down the column and flows from the chamber J through line 62.

When the flow of liquid is started the valve rod 57 is forced downward by the flowing liquid, allowing liquid to pass around the members 58a to 58e. The valve rod 57 is provided with a stop, not shown, to limit its downward movement in order to maintain a flow rate around the members 58a to 58e sufficient to prevent the ascent of resin. The necessary flow rate for particular operating condition can be readily determined by those skilled in the art. The resin in each chamber is expanded somewhat, i.e. fluidized by the downward fluid flow but under proper flow condition generally remains above a line represented by broken line R1. For example, the feed leaving the chamber F and entering the chamber G exerts a pressure on the member 58b and flows around it into the top of the chamber G. Similarly liquid flowing around the member 58c enters the chamber H without carrying with it resin from the chamber G, and so on throughout the height of the column. Treated liquid from the chamber J flows through the line 62 and a portion may be clarified and stored in the tank 55 with the remainder flowing to tailings.

Periodically a sample of liquid is withdrawn for testing from the chamber H, through sample line S1. When the sample shows that there has been a breakthrough of the material being recovered from the liquid, indicating saturation of the resin in the upper chamber, the resin in the chamber F is substantially completely drawn off for regeneration. Meanwhile, the breakthrough of the material being recovered at the bottom of the chamber H would be captured by the resin in the chamber I. The resin from each chamber is transferred substantially completely to the chamber immediately above and fresh resin added to the chamber J. These transfers are carried out in sequence down the column without interrupting the flow of pregnant liquor into the top of the column or the flow of barren liquid from the chamber J through the line 62 and the baffles 52 are so arranged, e.g. in the shape of frustums of hollow cones, as shown, to allow the substantially complete transfer to solid particles from one chamber to another and to prevent solids from accumulating in any chamber.

In the preferred method of transferring the resin, pump P6 which has a capacity in excess of that of the pump P5, for example 2Q', is started and valves V33, V34 and V35 are opened thus inducing a flow from the chamber F to the backwash chamber 53. In effect the flow Q' directed to the chamber F through the valve V32 passes through the valve V33, together with the balance of the capacity required to feed the pump P6, into the backwash chamber 53. The pump P6 delivers this total quantity (approx. 2Q') to the chamber F through the valve V35 via line 63. An amount equivalent to Q' continues to pass downwards from the chamber F into the chamber G around the member 58b and so on to the bottom of the column. The flow from the chamber F to the backwash chamber 53 carries with it the resin from the chamber F via line 61 and through valve V33. The time required for this transfer is dependent upon the flow induced by the pump P6 and the volume and specific weight of resin. The duration may be controlled by a timer or a suitable sensing device. At the end of this first stage of resin transfer, valves V36 and V37 are opened and the valves V33, V34, V35 closed.

Resin is then transferred from the chamber G to the chamber F by the pump P6 drawing a flow, for example 2Q', from the chamber F through the valve V36 and line 64 and delivering it into the chamber G through the valve V37 via line 65. Since there is a continuing flow, Q', through the valve V32 into the chamber F, in order to satisfy the pump P6, a volume of liquid equal to Q' flows upward around the member 58b from the chamber G into the chamber F, carrying with it the resin from the chamber G, while a flow equal to Q continues to flow from the chamber G around the member 58x into the chamber H and on down the column.

When the chamber G is empty of resin the valves V36 and V37 are closed and valves V38 and V39 are opened. This allows the pump P6 to draw a flow of 2Q' from the chamber G through the valve V38 and the line 64 and deliver it to the chamber H through the valve V39 via line 67 and line 66. Since there is a flow equal to Q' passing down the column from the chamber F to the chamber G, to satisfy the pump P6 a flow equal to Q' must pass up from the chamber H to the chamber G thereby transferring the resin contained in the chamber H into the chamber G. The process of resin transfer is continued until the resin from each chamber has been transferred to the chamber above by manipulating appropriate valves V40, V41 and V42 and V43 in the appropriate sequence similar to that described with reference to the upper chambers. When the resin from the chamber J has been transferred to the chamber I the valves V42 and V43 are closed. Freshly regenerated resin is then added to the chamber J. This completes the transfer of resin until a sample withdrawn through the line S1 again indicates a breakthrough at which time the procedure for transferring resin is repeated.

During the whole of this transfer process, pregnant liquor is continuously fed by the pump P5 through the valve V32 into the top of the column 51, and liquid flows continuously down the column and barren liquid is removed through the line 62. The column, as with that of FIG. 1 may contain a greater or smaller number of contacting chambers as desired for satisfactory operation.

Again, the capacity of the pump P6 as being 2Q' or twice that of the pump P5 is not critical, the ratio of sizes being chosen on the basis of resin transfer time and the greater the capacity of the pump P6 compared to that of the pump P5 resulting in shorter transfer time. The pump P6 is not essential for the practice of the invention since transfer without the pump P6 can be achieved, although slowly, by opening the valves V36 and V38 allowing the flow Q' to move from the chamber F to the chamber G partially through the valves V36 and V38 and partially around the member 58b. In this case the resultant reduction in rate of flow, i.e. a lower flow around the member 58b will be insufficient to prevent the resin from rising into the chamber F while the resin in the chamber H and the lower chambers will be kept in position by the flow, Q', passing around the appropriate members. Thus, transfer of solids can, as before, be accomplished without actually reversing the flow around the baffles 58b to 58e.

When the transfer of resin has been completed the volume of resin in the backwash chamber 53 is adjusted by opening valve V44, the valve V36 and valve V45 which results in a flow 2Q' from the chamber F through the valve V36, the line 64 and line 67 and the valve V45 and into the chamber 53 through strainer 73. A similar flow passes upward through line 69, having entered at inlet 70, through the valve V44 into the chamber F through line 71. Resin in the chamber 53 below the inlet 70 is carried into the chamber F leaving a definite quantity of resin in the chamber 53. A probe 72 in the chamber 53 adjacent the inlet 70 can be used to serve as a check that the backwash chamber has received the proper volume of resin and provide a warning in the event that insufficient resin is available in chamber 53.

When the level of resin in the chamber 53 has been adjusted the valves V44, V36, and V45 are closed and valves V46 and V47 opened. This causes liquid in the chamber 53 to flow out by gravity through strainer 73, the valve V46 and line 74 into the tank 54 leaving a space at the top of the tank filled with air entering through line 75, the valve V47 and the strainer 68. The level should be lowered to provide 12 to 18 inches of air space below the top of chamber 53 and this can be determined as with the embodiment of FIG. 1 by a level probe mounted in the sidewall of the tank, or from experience, a timer can be set to allow the tank to partially drain by gravity. The valve V46 is then closed and valve V48a is opened allowing air under pressure, from a source not shown, to enter the chamber 53 through line 76 and pass upwards through the bed of resin scouring it to release any slimes or particulate matter that may be adhering to the surface. The air leaves the chamber 53 through the strainer 68, the valve V47 and the line 75. The duration of the scouring period will depend on the amount, concentration and nature of the contaminants and, as before, this scouring operation can be omitted if operating conditions permit.

At the end of the air scour period, valve V48 is opened and clean water or clarified barren liquid from the tank 55 is pumped by pump P7 through line 77 into the bottom of the chamber 53 through the strainer 73. Thus a mixture of air and water or clarified barren liquid flows up through the resin and out through the strainer 68, the valve V47 and the line 75 to the feed tank 54. The valve V48a is then closed and water or clarified barren liquid alone backwashes the resin until it is clean. The duration of this step may be determined by light transmission measurements through the backwash water leaving the backwash chamber 53 although once experience has been gained a definite time can be used. The liquid used for backwashing has a density less than that of the resin. Once the contaminants have been removed the resin is ready for transfer to the elution column 56 for recovery of the desirable components. This transfer is achieved by closing the valves V48 and V47 and opening valves V49, V50, V51 and V52. Water or clarified barren liquor from the tank 55 is pumped by the pump P7 entering the chamber 53 partially through line 78 and the strainer 73 and partially through the strainer 68 respectively. The liquid entering through the line 78 fluidizes the resin at the bottom of the chamber and it flows out as a slurry through the valve V51 and line 79 into the bottom of the elution column 56, by the flow of liquid indiced by the pump P7 which enters the chamber 53 through the strainers 73 and 68. The relative flows through the valves V49 and V50 govern the rate at which the resin is transferred. In the preferred operation the flow through the valve V50 is at least 1.5 times the flow through the valve V49. The termination of this transfer operation may be controlled either on the basis of light transmission on a clear section of the line 79 or a device actuated by the level of resin in the column 56. On completion of the transfer, the valves V49, V50, V51 and V52 are closed and the pump P7 is stopped.

Although FIG. 3 shows a separate backwash chamber it can form an integral part of the contacting column with the lower part of the chamber surrounding the top of the column.

The resin transferred from the chamber 53 will be in the lower section of the column 56. To recover the desirable components from it the liquid used for transporting the resin is first displaced from the interstices of the resin by opening valves V53, and V54 and pumping water or clarified barren liquid from the storage tank 55 by the pump P7 through the valve V54 downward through the the column 56, the valve V53 and line 81 to the feed tank 54 at a controlled rate just sufficient (approx. 0.6 volumes of liquid per volume of resin), to displace the barren liquid. The liquid entering through the valve V54 rinses the freshly regenerated resin in the top of the column 56. All valves associated with the column are then closed and the pump P7 stopped for a short period of time for ion exchange to take place or in other words to allow the elutant to achieve equilibrium with the resin. As with the embodiment of FIG. 1, the duration of the period will depend on the overall transport rates of the absorption cycle as well as other conditions of operation and can be readily determined by those skilled in the art. At the end of the period a predetermined volume of the eluate containing the desired components is then removed from the column through line 82 by starting the pump P7 and pump P8 and opening valves V55 and V56 and the valve V54.

The barren liquid entering through the valve 54 further rinses the freshly regenerated resin in the top of the column 56 and dilutes the regenerant from tank 83 to the required strength. After the predetermined volume of regenerant has entered the column 56, the valves V55, V56 and V54 are closed and the pumps P7 and P8 are stopped and the resin in the column 56 remains in contact with the regenerant.

The column 56 holds several batches of resin, for example three of four, depending upon the operating transfer rates. Each resin batch gradually moves up the column 56, being pushed up by a batch of freshly washed resin from the backwash chamber 53 entering at the bottom. Fresh resin is transferred from the top of the column 56 through line 80 to the chamber J of the contacting column 51 by starting the pump P7 and opening valves V57 and V58 and the valve V54. Line 84 joins the column 56 slightly above line 85. The valves V58 and V54 are used to control the relative flows entering the column through the line 84 and line 86 with a minor proportion entering through the line 84 and a major proportion through the line 86. The flow entering through the line 84 produces a slurry of the resin in the column adjacent to the point at which the line 85 joins the column and the major portion (at least 60%) entering through the line 86 forces the slurried resin from the column through the line 85 and the line 80 into the chamber J of the column 51.

In the case where there is too much resin in the column 56 and there is insufficient space for resin from the backwash tank to enter the top portion of the column 56, then the excess resin can be removed through valve V59.

In may be found desirable to lower the liquid level in the column 56 after transferring resin to the column 51 to a point just above the remaining resin level. This serves to lower the pressure required to introduce resin into the bottom of the column 56.

As with the embodiment of FIG. 1, the entire operation may be shut down by closing all valves and stopping the pumps. The resultant stopping of downward flow of liquid in the column 51 allows the valve rod 57 to rise causing the members 58a to 58e to seal off the top of their respective contacting chambers thus retaining the resin of each chamber.

When the plant utilizing the embodiment of FIG. 3 is initially commissioned a definite quantity of resin may be charged through suitable access ports in the wall of the column 51, the valve rod 57 being in its highest position.

Figure 4:
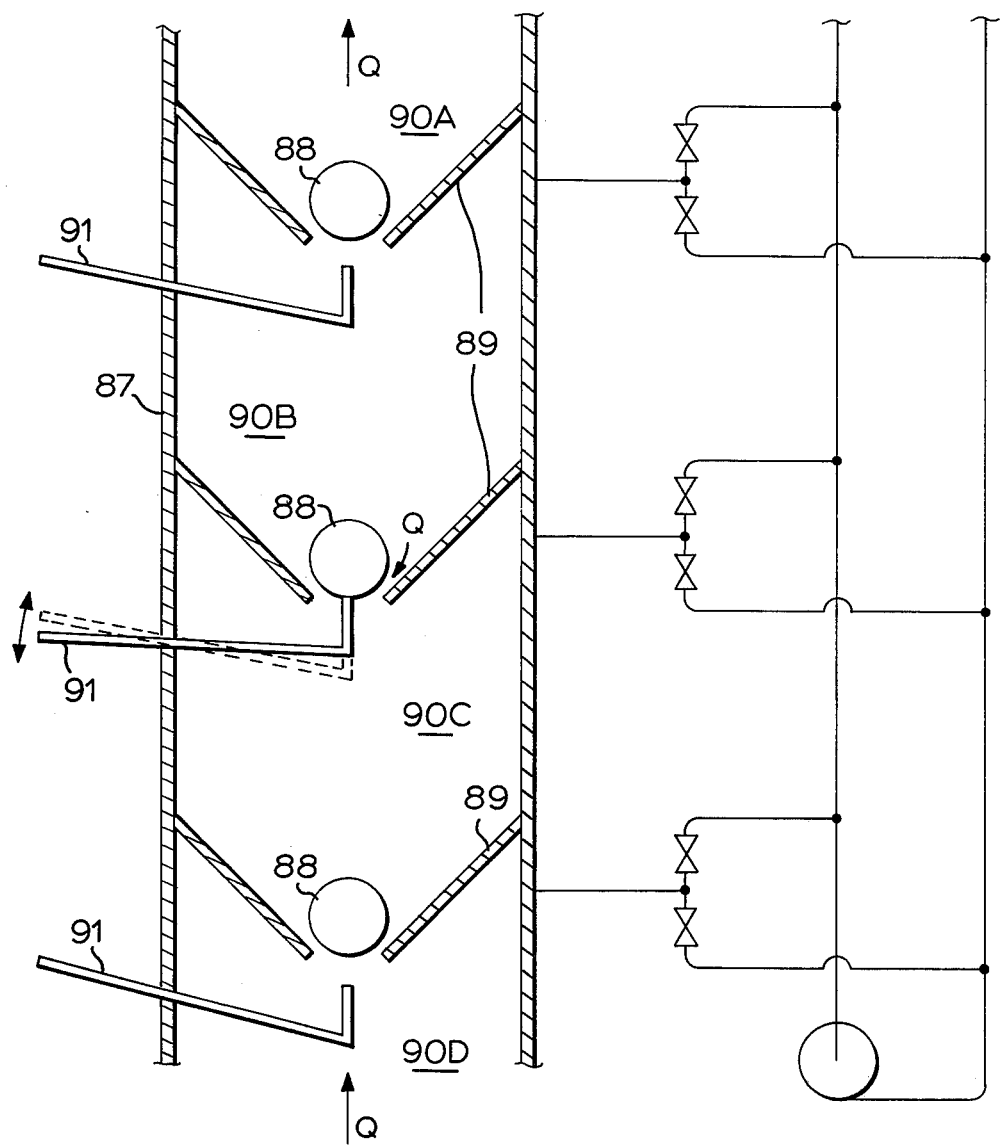
FIG. 4 is a schematic representation of an alternate arrangement for valving of the chambers in a column embodying the invention.

A portion of an absorption column embodying the invention is shown schematically in FIG. 4, which column uses an alternative method of sealing off the absorption column chambers namely by use of spherical members for valving between the column chambers. As with the column in the embodiment of FIG. 1, column 87 of FIG. 4 is arranged for contacting fluids and solids with the fluids being lighter and rising in the column against the downward flow of the solids. In the column 87 spherical valve members 88 normally rest on baffles 89 separating chambers 90A, 90B, 90C and 90D. The valve members 88 are restrained from closing the openings between the column chambers during the downward flow of. for example resin, by rods 91 operated from outside the column 87. The weight of the spherical members 88 are such as to have a density greater than the solution in the column 87 so that they seat themselves to cover the opening in the baffles 89 on cessation of flow but allow sufficient resistance in upward flow such that the velocity of fluid passing from one chamber to the next around the valve members is sufficient to prevent countercurrent flow of resin.

EXAMPLE I

An example of a typical operation using the apparatus of the invention is the hydrometallurgical process for the recovery of uraniun. After the uranium ore is ground, the uranium ions are put into solution using an acid such as sulphuric acid or other suitable reagent and large particles removed. The resulting slurry or leach liquor is fed through the contacting column containing an ion exchange resin where it is stripped of uranium ions. Sulphuric acid leach liquor is contacted with an anion exchange resin where the process depends on the high affinity of the uranium sulphate complexes for the anion exchange resin. The pH of the solution is adjusted, for example to 1.0 to 1.5 and a typical solution contains up to 2 grams or more of uranium sulphate per liter prior to ion exchange treatment. In carrying out the process, the uranium concentration in the resin and the solution decreases from the bottom to the top of the column. Conditions, such as liquid retention time and total throughput of solution per unit volume of resin are adjusted so as to achieve essentially complete saturation of the resin in the lowest contacting zone, and essentially complete removal of uranium from the solution before it leaves the top of the contacting column. In a typical operation, after a period of time, say 1 to 2 hours, the resin in the lowest contacting chamber becomes saturated and the barren liquid from the top of the column contains only a few per cent, for example 2 per cent or less, of the uranium concentration in the feed. At this time, the resin from the bottom zone is removed over a short period of time, for example 2 minutes, and the resin in the higher zones is then transferred successively as described hereinabove to the zone immediately below with the resin in the upper zone being replaced by fresh resin. The transfers are carried out from one zone to the next whilst maintaining a continuous flow of liquid through the remaining zones. The resin in the lowest chamber is again allowed to reach saturation, and the removal and transfer of resin is repeated. Uranium may be recovered from the resin removed from the botton zone by conventional methods. The particular conditions required for optimum results of a particular operation may be readily determined by pilot plant tests. Factors which must be considered will be apparent to those skilled in the art and include, the desired cycle time, uranium input, amount of resin in each zone and the total number of zones.

EXAMPLE II

The invention is also typified by the following operation involving the softening of City of Toronto tap water containing an initial hardness of 150 ppm. as $CaCo_3$. A standard grade of 20–50 mesh strongly acidic polystyrene bead type Dowex 50 resin was used in the operation (other similar resins such as C20 and 1R120 also being usable).

The maximum continuous water flow available was 5.5 U.S. gpm, and this was passed upward through a column consisting of six chambers each 10 inches diameter by 24 inches high and each containing 0.2 ft.$^3$ of resin. A resin transfer cycle was carried out when the hardness at the outlet of the fourth chamber reached 2 ppm, as $CaCo_3$. The time required to transfer the resin from chamber to chamber was less than a minute when the angle of the inverted cone baffles was 45°, the recirculating pump $P_3$ (see FIG. 1) was delivering approximately 7.5 U.S. gpm. and the unit was softening 5.5. U.S. gpm.

The time taken to reach breakthrough in the fourth chamber was approximately 100 mins. between resin transfer cycles. The effluent concentrations of hardness from the individual chambers in this test were typically as follows.

| | | Hardness ppm. as $CaCO_3$ | |
|---|---|---|---|
| | | Influent | Effluent |
| Chamber | 1 | 150 | 138 |
| | 2 | 138 | 108 |
| | 3 | 108 | 26 |
| | 4 | 26 | 0 |
| | 5 | 0 | 0 |
| | 6 | 0 | 0 |

During the whole of the operation effluent hardness was zero as measured by the EDTA test.

On several occasions the flow to the unit was deliberately stopped and the unit immediately came to rest with the various batches of resin remaining in their individual chambers. On resuming full flow the unit started up automatically and produced zero soft water immediately.

As has been described with reference to FIGS. 1 and 3 of the drawings, the baffles separating the adjoining chambers of the contacting column of the invention are so arranged to allow the substantially complete transfer of solid particles from one chamber to another and to prevent solids from accumulating in any chamber. Although examples of baffle arrangements accomplishing such an end are shown as inverted frustums of hollow cones and frustums of hollow cones in FIGS. 1 and 3 respectively, other arrangements, such as those shown in FIGS. 5 and 6, can be utilized.

Figure 5:
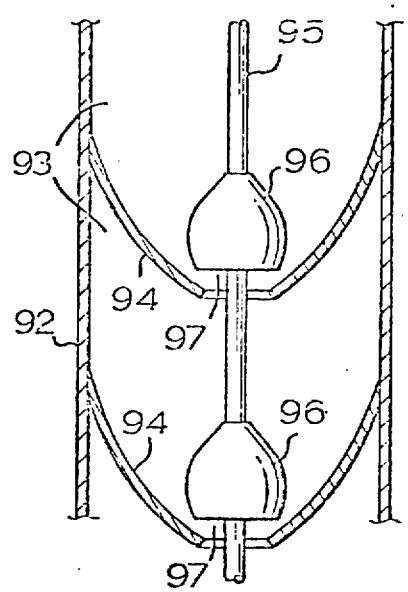
FIGS. 5 and 6 show variations of baffle arrangements in contacting columns embodying the invention.

Referring to FIG. 5, a portion of a contacting column 92 embodying the invention is shown which is used for contacting fluids with solids wherein the solids are heavier, as with the column shown in FIG. 1. In the arrangement of FIG. 4 superposed contacting chambers 93 are separated by baffle members 94 which have a bowl-like shape or a cross-section of parabolic configuration. Valve rod 95 is mounted centrally in the column 92 and the rod 95 carries bell-like stop members 96 which are adapted to close openings 97 in the baffle members 94 by lowering of the valve rod 95. The stop members 96 have bases with a diameter slightly greater than the diameter of the openings 97 in the baffles to enable closing thereof and are so shaped to minimise hang-up of particles during transfer of solids from one chamber to another and to reduce turbulence of fluid. The shape of the baffles 24 also allows for essentially complete removal of solid particles upon transfer thereof from one chamber to another.

Figure 6:
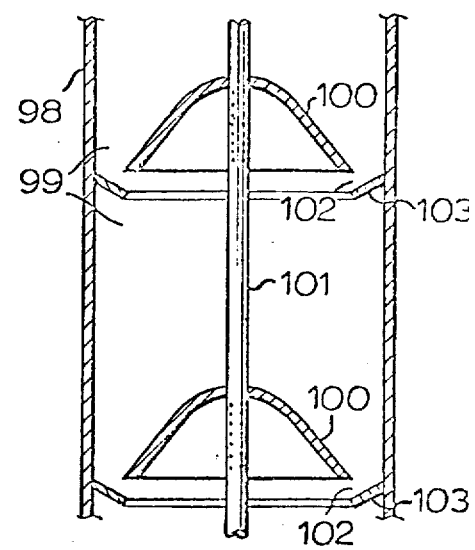

Referring to the alternate arrangement shown in FIG. 6, the baffles separating the chambers in the column can be combined with the stop or closure members, as shown. Thus, contacting column 98 embodying the invention, only a portion of which is shown in FIG. 6, has superposed contacting chambers 99 separated by inverted cup-shaped members 100 which are attached to valve rod member 101 and which act as baffle members separating the chambers 99 and as stop members adapted to close annular openings 102 through or around the baffle members 100. Such closure is effected by lowering the valve rod member 101 to seat the members 100 on rubber seating rings 103.

As with the column of FIG. 5, that of FIG. 6 is adapted for contacting of solid particles with fluids wherein the solids are heavier than the fluids, so that, there is upward flow of fluids and downward flow of solids in the column. The baffles 100 and the seating rings 103 are so shaped to minimize hang-up of solid particles and allow for substantially complete removal of solids upn transfer thereof from one chamber to a lower chamber.

The means acting in combination with the baffles, in the contacting columns embodying the invention specifically described herein, which act to prevent solid particles from passing through the openings between the chambers when there is cessation of fluid flow through the column have been described hereinbefore as closure, valve or stop means which actually move against and close off the openings. It can be appreciated that means having no moving parts can also be utilized to stop solid movement between chambers, such as for example so-called "chicken type" feeding devices. Such a device is shown in FIG. 7.

Figure 7:
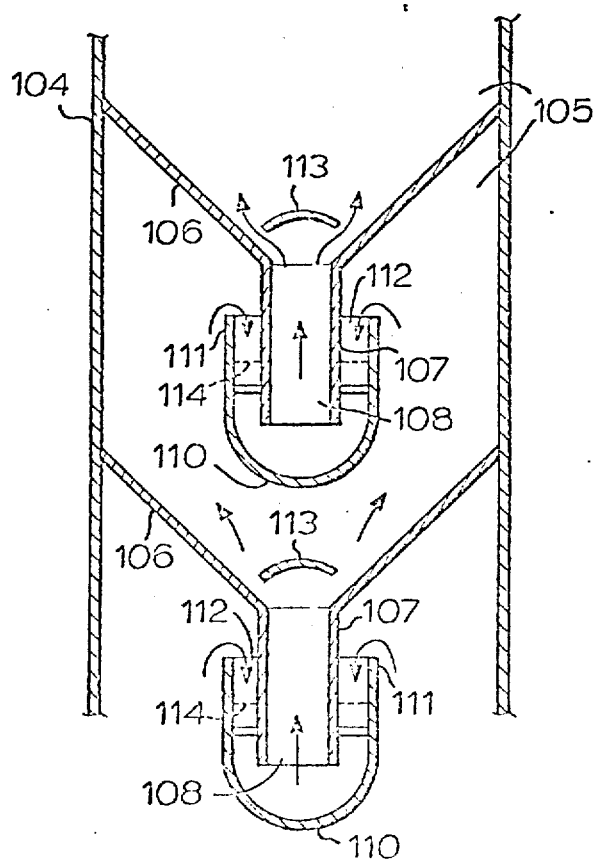
FIG. 7 shows a still different arrangement of closure or stop members for the contacting chambers in a column embodying the invention.

Referring to FIG. 7, a contacting column 104 embodying the invention, only a portion thereof being shown, has superposed contacting chambers 105 separated by baffle members 106 supported within the column 104. Extending downwardly from each of the baffles 106 is a cylindrical hollow leg member 107 having an open bottom end 108. Surrounding each of the legs 107 is a cylindrical closure member 109 having a rounded closed lower end 110 and an open upper end 111. The upper end 111 defines an annular opening 112 with the leg 107. A baffle member 113 is advantageously located over the upper end of the leg 107.

During operation of the column 104, which is adapted to treat solid particles with a fluid, the solids being heavier, fluid is passed upwardly in the direction of the arrows with solids being fluidized and suspended in the chambers 105. Upon cessation of fluid flow in the column 104, the solids being contacted settle into the legs 107 and rise in the closure members 109 to a level such as that shown by broken line 114, thereby preventing movement of solid particles into the chamber below. It has been found that such a device works well in contacting columns embodying the invention. Actual transfer of solid particles from any of the contacting chambers 105 is accomplished by reversing the flow of fluid between chambers to carry fluid and solids down the leg 107 and into and over the open end of the closure member 109 and from thence into the chamber below.

Although particular reference has been made to the use of the invention in recovering uranium and softening water, this is not to be interpreted as limiting the invention or claims since the apparatus and method of the invention may be used in a wide variety of liquid/solid contacting processes such as ion exchange processes, absorption on carbon and other like absorbents, sugar and fruit juice treatment, water purification and softening, recovery of valuable dissolved constituents from a liquid such as in hydrometallurgy, preparations of chemicals. etc., in anti-pollution operations, as well as other like processes which will be obvious to those skilled in the art. The invention may be used with turbid liquids such as for treating unclarified leach liquors, mine waters effluents from tailings ponds and tertiary treatment of sewage.

What I claim as my invention is:

1. A continuous process for contacting fluids with solid particles comprising:

introducing untreated fluid into one end of a fixed, vertical contacting column, causing said fluid to flow vertically through a plurality of superposed contacting chambers, adjoining contacting chambers in all of the superposed chambers being separated by baffle members and each contacting chamber having openings in the top and bottom thereof through the baffle members for flow of fluid therethrough, the openings being provided with means acting in combination with the baffles to prevent solid particles passing therethrough upon cessation of fluid flow through the column, and continuously removing treated fluid from the other end of the column, a substantially equal portion of said solid particles being located in each of said contacting chambers and said solid particles being retained in the contacting chambers in a fluidized state by maintaining the flow of fluid through the openings in the chambers such as to prevent movement of the solid particles between adjoining contacting chambers, periodically removing solid particles substantially completely from the contacting chamber at the said one end of the column into a backwash chamber by reducing the rate of flow of untreated fluid from the said one end of the column through the contacting chamber at said one end and inducing flow of fluid into said backwash chamber, directing a flow of fluid equivalent to that induced into said backwash chamber out of said backwash chamber and back into the contacting chamber at the said one end of the column at a location adjacent the contacting chamber next in the direction of flow of fluid, and, commencing with the said contacting chamber next in the direction of flow of fluid to said contacting chamber at the said one end of the column, causing the solid particles to be transferred progressively and substantially completely through said openings from each chamber to the adjoining chamber in the direction opposite to the flow of fluid through the column by successively reducing the rate of flow of fluid through said each chamber until the solid particles in the chamber at the said other end of the column have been substantially completely removed therefrom and transferred into the adjoining contacting chamber, said baffle members being arranged to allow the substantially complete removal of solids from and to prevent accumulation of solids in any chamber, said transfer from each chamber to the adjoining chamber being affected by reducing the rate of flow of fluid within the column between said adjoining chamber and said each chamber, to allow movement of solids from said each chamber to said adjoining chamber, by providing, only during transfer of solids from said each chamber to said adjoining chamber, an external bypass for the flow of fluid from said adjoining chamber to said each chamber, while retaining the solid particles in the remaining chambers by the flow of fluid therethrough and, while continuing the flow of untreated fluid into the column and of treated fluid out of the column, and, when progressive transfer of solids through the column with resulting transfer of solid particles from the chamber at the other end of the column to its adjoining chamber has been completed, introducing a fresh substantially equal portion of solid particles into the chamber at the said other end of the column.

2. The process according to claim 1, in which said solid particles comprise an ion exchange resin.

3. The process according to claim 2 wherein the solid particles of resin removed from the contacting chamber at the one end of the column are transferred to a vertical vessel, the volume of the resin is measured and the resin is subsequently cleaned after which the resin is transferred to the bottom of a fixed vertical elution column for recovery of desirable components therefrom, the elution column having smooth internal surfaces with no protruding pipes or fittings within to interfere with resin movement and fluid level in the elution column being lowered to approximately the same level as the resin therein by removal of liquid therefrom prior to introduction of a further batch of resin into the elution column.

4. The process of continuously treating a fluid to remove components therefrom, comprising;
contacting the fluid with solid particles contained in a plurality of superposed contacting chambers within a fixed, vertical contacting column, adjoining contacting chambers in all of the superposed chambers being separated by baffle members and each contacting chamber containing a substantially equal portion of said solid particles and having openings in the top and bottom thereof through the baffle members for flow of fluid therethrough, the openings being provided with means acting in combination with the baffles to prevent solid particles passing therethrough upon cessation of fluid flow through the column, by introducing untreated fluid into one end of the column, passing the fluid through the contacting chambers and continuously removing treated fluid from the other end of the column, the flow rate of fluid through the openings being controlled so as to prevent the movement of the solid particles between contacting chambers,
periodically removing solid particles substantially completely from the contacting chamber at said one end of the column into a backwash chamber while maintaining the flow of fluid through the remaining contacting chambers, by reducing the rate of flow of untreated fluid from the said one end of the column through the contacting chamber at said one end and inducing flow of fluid into said backwash chamber, directing a flow of fluid equivalent to that induced into said backwash chamber out of said backwash chamber and back into the contacting chamber at the said one end of the column at a location adjacent the contacting chamber next in the direction of flow of fluid.
commencing with the said contacting chamber next in the direction of flow of fluid to said contacting chamber at the said one end of the column, progressively and substantially completely transferring the solid particles in a direction opposite to the fluid flow through the column from each chamber to the chamber immediately adjoining through the openings by successively reducing the rate of flow of fluid through said each chamber until the solid particles in the chamber at the said other end of the column have been substantially completely removed therefrom and transferred into the adjoining contacting chamber, the baffle members being arranged to allow the substantially complete removal of solids from and to prevent accumulation of solids in any chamber, upon each transfer of solid particles from any of each chambers to an adjoining chamber, removing fluid from the adjoining chamber and introducing it to said each chamber by an external bypass, thereby reducing the rate of flow of fluid between the adjoining chamber and said each chamber, thereby allowing the solid particles to move into said adjoining chamber, and then, when the progressive transfer of the solid particles has resulted in transfer of the solid particles from the chamber at the other end of the column to its adjoining chamber, adding fresh solid particles to the contacting chamber at said other end of the column.

5. The process according to claim 4, wherein said solid particles comprises an ion exchange resin.

6. A process according to claim 5 wherein the solid particles of resin removed from the contacting chamber at the one end of the column are passed into a measuring and cleaning vessel, treated if necessary with suitable cleaning fluids and then transferred to an elution or regenerating column where the particles are treated and made suitable for use as fresh solid particles and ready to be added to the contacting chamber at the other end of the column when it is devoid of solid particles.

7. The process according to claim 5, wherein the solid particles of resin removed from the contacting chamber at the one end of the column are transferred to an elution column for recovery of desirable components and liquid level in the elution column is lowered by removing liquid therefrom before the introduction of a further batch of resin into the elution column.

8. The process according to claim 5, wherein the fluid to be treated is a turbid liquid.

9. The process according to claim 6, wherein the untreated liquid has a density less than that of the solid particles and is introduced into the bottom of the column, is caused to flow upward through the contacting chambers and is removed from the top of the column and the solid particles are removed from the lowest contacting chamber.

10. The process according to claim 8, wherein the untreated liquid has a density greater than the effective density of the solid particles and is introduced into the top of the column, is caused to flow downward through the contacting chambers and is removed from the bottom of the column and the solid particles are removed from the highest contacting chamber.

11. An apparatus for contacting fluids and particulate solids which comprises:
 a. a vertical column having an untreated fluid inlet at one end thereof, a fluid/solids outlet at the same end, and a treated fluid outlet adjacent the other end thereof,
 b. said column having internally positioned a plurality of vertically spaced baffles, said baffles and the wall of said column defining a series of contacting chambers with the baffles dividing the column into said chambers, each contacting chamber having an opening in the top and an opening in the bottom thereof through the baffles, and the baffles being arranged to allow substantially complete removal of solids from and to prevent accumulation of solids in any chamber,
 c. said openings provided with means acting in combination with the baffles to prevent solid particles passing therethrough upon cessation of fluid flow through the column,
 d. means for introducing untreated fluid into said untreated fluid inlet,
 e. external pipes for transferring fluid from each of said chambers to the next adjoining chamber and valves associated with said external pipes for controlling the transfer of fluid therethrough, and
 f. fluid moving means for causing fluid flow through said external pipes and valves, said fluid moving means, pipes and valves being arranged to induce flow of solid particles through the openings in the baffles of any one chamber to the next adjoining chamber opposite to the direction of flow of fluid in the column.

12. Apparatus according to claim 11 in which the means for preventing solid particles passing through the openings comprises a cone shaped structure in each contacting chamber, each said structure having a base member with a diameter greater than the diameter of the opening, thus effectively closing the opening when placed thereagainst, each of said structures being connected to a rod passing throughout the length of the column and arranged so that all openings are closed substantially simultaneously by movement of the rod upon cessation of fluid flow.

13. Apparatus according to claim 11 in which the means for preventing solid particles passing through the openings comprises a valve member in each contacting zone of such size as to seal off the openings, the valve members being raised or lowered to open or close the openings by means of rods operated from outside the column, one rod being adjacent to each contacting chamber.

14. Apparatus according to claim 11, in which the bottom of the column is in the shape of an inverted cone.

15. Apparatus according to claim 11, in which the untreated fluid inlet and the fluid/solids outlet are adjacent the bottom of the column and the treated fluid outlet is adjacent the top of the column and the baffles dividing the column into chambers form vertically spaced inverted frustums of hollow cones.

16. Apparatus according to claim 11, in which the untreated fluid inlet and the fluid/solids outlet are adjacent the top of the column and the treated fluid outlet is adjacent the bottom of the column and the baffles dividing the column into chambers form vertically spaced frustums of hollow cones.

* * * * *

UNITED STATES PATENT OFFICE
CERTIFICATE OF CORRECTION

Patent No. 4,035,292  Dated July 12, 1977

Inventor(s) Alexander Himsley  Page 1 of 2

It is certified that error appears in the above-identified patent and that said Letters Patent are hereby corrected as shown below:

The sheet of drawing containing Figures 5, 6 and 7 as shown on the attached page should be added.

Signed and Sealed this

Twenty-fifth Day of October 1977

[SEAL]

Attest:

RUTH C. MASON  LUTRELLE F. PARKER
*Attesting Officer*  *Acting Commissioner of Patents and Trademarks*